US011093717B2

United States Patent
Hätty et al.

(10) Patent No.: US 11,093,717 B2
(45) Date of Patent: Aug. 17, 2021

(54) DOMAIN-SPECIFIC PROCESS DIFFICULTY PREDICTION

(71) Applicant: Robert Bosch GmbH, Stuttgart (DE)

(72) Inventors: Anna C. Hätty, Stuttgart (DE); Bingqing Wang, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 16/682,572

(22) Filed: Nov. 13, 2019

(65) Prior Publication Data

US 2020/0151260 A1 May 14, 2020

Related U.S. Application Data

(60) Provisional application No. 62/767,286, filed on Nov. 14, 2018.

(51) Int. Cl.
- *G06F 40/30* (2020.01)
- *G06K 9/46* (2006.01)
- *G06N 3/04* (2006.01)

(52) U.S. Cl.
CPC .............. *G06F 40/30* (2020.01); *G06K 9/46* (2013.01); *G06N 3/0445* (2013.01); *G06K 2209/01* (2013.01)

(58) Field of Classification Search
CPC ...... G06F 40/30; G06K 9/46; G06K 2209/01; G06N 3/0045
See application file for complete search history.

(56) References Cited

U.S. PATENT DOCUMENTS

| | | | | |
|---|---|---|---|---|
| 9,911,413 | B1* | 3/2018 | Kumar | G10L 15/16 |
| 10,170,107 | B1* | 1/2019 | Dreyer | G10L 15/26 |
| 10,453,117 | B1* | 10/2019 | Reavely | G06Q 30/0645 |
| 10,482,904 | B1* | 11/2019 | Hardie | G10L 25/87 |
| 10,747,894 | B1* | 8/2020 | Cline | G06F 21/6209 |
| 2014/0229164 | A1* | 8/2014 | Martens | G06F 40/40 704/9 |
| 2017/0286835 | A1* | 10/2017 | Ho | G06F 16/367 |
| 2019/0114300 | A1* | 4/2019 | Miltsakaki | G06F 40/216 |
| 2019/0179606 | A1* | 6/2019 | Thangarathnam | G06F 40/30 |
| 2020/0090651 | A1* | 3/2020 | Tran | G10L 15/16 |
| 2020/0175408 | A1* | 6/2020 | Baughman | G06N 3/04 |
| 2021/0034784 | A1* | 2/2021 | Baughman | G06Q 50/01 |

\* cited by examiner

*Primary Examiner* — Kevin Ky

(74) *Attorney, Agent, or Firm* — Maginot, Moore & Beck LLP

(57) ABSTRACT

A method of determining an operational difficulty of a process described in a document including text includes generating text data corresponding to the text of the document, and generating a word vector output by processing the text data through a plurality of word vectors, the plurality of word vectors based on a domain-specific text collection and a general-language text collection. The method further includes generating a statistical information output by processing the text data through a plurality of statistical information vectors, the plurality of statistical information vectors based on the domain-specific text collection and the general-language text collection, and generating a gated recurring unit (GRU) output by processing (i) the word vector output, (ii) the statistical information output, (iii) word-level data based on the text data, (iv) sentence-level data based on the text data, and (v) paragraph-level data based on the text data through at least one GRU.

12 Claims, 3 Drawing Sheets

DOMAIN-SPECIFIC PROCESS DIFFICULTY PREDICTION

This application claims the benefit of priority of U.S. provisional application Ser. No. 62/767,286, filed on Nov. 14, 2018 the disclosure of which is herein incorporated by reference in its entirety.

FIELD

This disclosure relates to the field of natural language processing of a text document.

BACKGROUND

Systems have been developed to predict the "readability difficulty" of a document including text. The readability difficulty is a measurement of how difficult a document is to read and to understand for an average person or a person of a particular skill set. Much research for readability difficulty has been done in the medical domain to improve communication between doctors and patients to increase patient understanding of written instructions from a doctor, for example. Systems that determine readability difficulty usually include a learning algorithm and several linguistic features, such as, for example, number of words analysis, type-token-ratio calculation, and lists of affixes.

Another type of difficulty measurement of a document including text is referred to as "operational difficulty." The operational difficulty is a measurement of the level of difficulty to complete a task or project described in the text of the document for an average person or for a person of a particular skill set.

Few studies have been conducted in determining automated ways of measuring the operational difficulty of a task described with text in a document. Instead, research work is commonly reported in document classification, which is related to operational difficulty but is a different process. Multi-class document classification is a process of assigning a document to one or more classes or categories. Document classification does not consider the ordering/ranking of the classes, which is present for operational difficulty. Thus, document classification disregards potentially valuable information, such as when the classes are very unbalanced. Besides, the few studies directed to automated ways of determining operational difficulty at the document level tend to explore linguistic features of the text in the document, such as bag-of-words analysis and language models. These methods of determining operational difficulty are typically either inefficient in real-world applications and/or inaccurate in real-world applications.

Accordingly, further advancements in the area of automatically determining operational difficulty are desired.

SUMMARY

According to an exemplary embodiment of the disclosure, a method of determining an operational difficulty of a process described in a document including text includes generating text data corresponding to the text of the document, and generating a word vector output by processing the text data through a plurality of word vectors, the plurality of word vectors based on a domain-specific text collection and a general-language text collection. The method further includes generating a statistical information output by processing the text data through a plurality of statistical information vectors, the plurality of statistical information vectors based on the domain-specific text collection and the general-language text collection, and generating a gated recurring unit (GRU) output by processing (i) the word vector output, (ii) the statistical information output, (iii) word-level data based on the text data, (iv) sentence-level data based on the text data, and (v) paragraph-level data based on the text data through at least one GRU. Additionally, the method includes generating difficulty data by processing the GRU output through an ordinal regression unit, the difficulty data corresponding to the operational difficulty of the process described in the documenting including the text, and associating the generated difficulty data with the document, such the operational difficulty of the process described in the document is numerically quantifiable.

According to another exemplary embodiment of the disclosure, a method of determining an operational difficulty of a process described in a document including text includes generating text data corresponding to the text of the document, generating a word vector output by processing the text data through a plurality of word vectors, the plurality of word vectors based on a domain-specific text collection and a general-language text collection, and generating a statistical information output by processing the text data through a plurality of statistical information vectors, the plurality of statistical information vectors based on the domain-specific text collection and the general-language text collection. The method further includes processing the word vector output, the statistical information output, and word-level data based on the text data through a first gated recurrent unit (GRU) to generate a word-level output, processing the word-level output, the word-level data, and sentence-level data based on the text data through a second GRU to generate a sentence-level output, and processing the sentence-level output, the sentence-level data, and paragraph-level data based on the text data through a third GRU to generate a GRU output. Additionally, the method includes generating difficulty data by processing the GRU output through an ordinal regression unit, the difficulty data corresponding to the operational difficulty of the process described in the documenting including the text, and associating the generated difficulty data with the document.

According to a further exemplary embodiment of the disclosure, a difficulty system for determining an operational difficulty of a process described in a document including text includes a user device and a computer system. The user device includes an imaging device configured to generate text data of the text, a transceiver configured to transmit the text data, and a display screen configured to display difficulty data. The computer system includes a transceiver configured to receive the transmitted text data, and a controller including a neural network. The controller is configured to generate a word vector output by processing the text data through a plurality of word vectors, the plurality of word vectors based on a domain-specific text collection and a general-language text collection, and generate a statistical information output by processing the text data through a plurality of statistical information vectors, the plurality of statistical information vectors based on the domain-specific text collection and the general-language text collection. The controller is further configured to generate a gated recurring unit (GRU) output by processing (i) the word vector output, (ii) the statistical information output, (iii) word-level data based on the text data, (iv) sentence-level data based on the text data, and (v) paragraph-level data based on the text data through at least one GRU, and generate difficulty data by processing the GRU output through an ordinal regression unit, the difficulty data corresponding to the operational difficulty of the process described in the document. The transceiver of the computer system is configured to transmit the difficulty data to the transceiver of the user device for display on the display screen, and the difficulty data is associated with the document.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
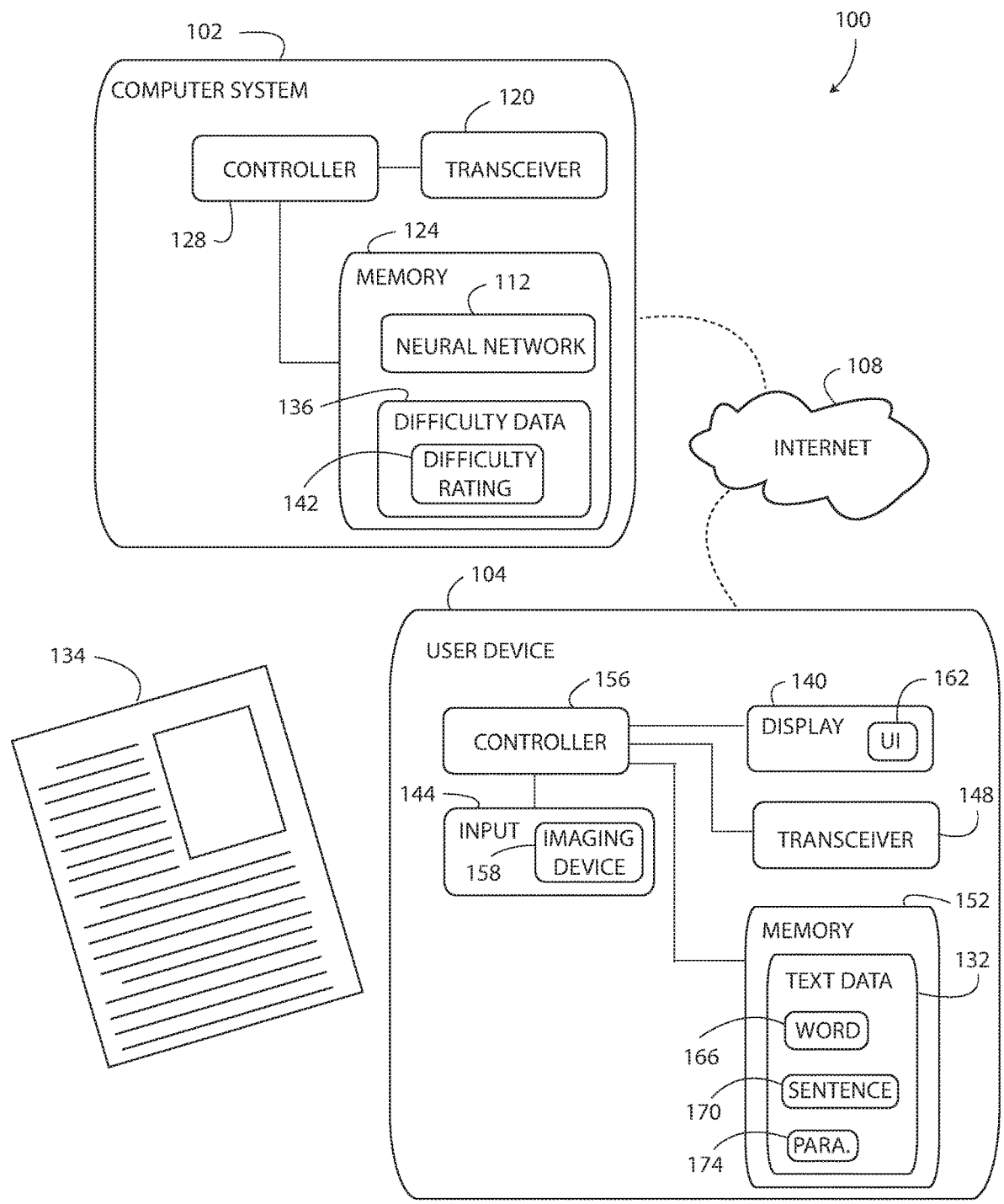
FIG. 1 is a block diagram of a difficulty system including a computer system, as disclosed herein, configured to automatically determine the operational difficulty of text data describing a process or task, the system also includes a user device configured to generate the text data and to display the difficulty data.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a difficulty system 100 includes a computer system 102 and a user device 104 each communicatively coupled to each other via the Internet 108. The user device 104 is operable to generate text data 132 from a document 134, for example, and to receive an operational difficulty rating 142 of a process or task described in the document 134, as determined by the computer system 102. As set forth below, the system 100 is an improvement over existing devices for automatically determining operational difficulty, because the difficulty system 100 includes a deep-learning neural network 112 that includes automatically-extracted linguistic features configured to predict the operational difficulty of processes and tasks described in text-based documents, such as the document 134. The concept of "operational difficulty" and each element of the system 100 is described in detail.

The operational difficulty of a process is useful for assigning or recommending the process to individuals according to their personal skills levels. As used herein, the term "process" includes any task or series of steps described in the document 134. Moreover, understanding the operational difficulty of a process is useful on an individual level. For example, a user may want to know in advance the operational difficulty in preparing a meal described in a written recipe (an exemplary document 134) or the operational difficulty in repairing an automobile as described in a written repair manual (another exemplary document 134). Furthermore, an employee may want to know the operational difficulty of processes described in a company-internal document (e.g. purchasing workflow, component install/configuration order, work instructions all of which are exemplary documents 134) so that the employee can properly prioritize her schedule. The system 100 automatically and accurately determines the operational difficulty of a process described in the document 134.

As shown in FIG. 1, the exemplary document 134 includes text and a picture. The text is organized by paragraphs including sentences and words. The document 134 may be a single page or a plurality of pages. The document 134 may be a paper copy, a hardcopy, or an electronic document in any format and on any media.

The computer system 102 includes a transceiver 120 and a memory 124 operatively connected to a controller 128. The transceiver 120 is configured to send electronic data to the user device 104 using the Internet 108 and to receive electronic data from the user device 104 using the Internet 108. In one embodiment, the transceiver 120 includes a wired connection to the Internet 108, and in another embodiment the transceiver 120 includes a wireless connection to the Internet 108. In some embodiments, the transceiver 120 sends and receives data using a cellular network, a wireless local area network ("Wi-Fi"), a personal area network, and/or any other wireless network. Accordingly, the transceiver 120 is compatible with any desired wired or wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 124 of the computer system 102 is an electronic data storage unit, which is also referred to herein as a non-transient computer-readable medium. The memory 124 is configured to store the neural network 112, which is trained to process the text data 132 and to generate difficulty data 136 corresponding to a measurement of the operational difficulty of the process described by the document 134. The memory 124 also stores any other electronic data associated with the computer system 102.

The controller 128 of the computer system 102 is configured to execute program instructions for controlling the transceiver 120 and the memory 124, and for operating the neural network 112. The controller 128 is configured as a central processing unit ("CPU"), a microprocessor, a processor, or any other type of electronic control chip.

The user device 104 includes a display screen 140, an input device 144, a transceiver 148, a memory 152, and a controller 156. In one embodiment, the user device 104 is configured as a smartphone, a tablet computer, a smartwatch, or any other portable electronic device having access (wired or wireless) to the Internet 108. In another embodiment, the user device 104 is configured as a desktop computer or any other non-portable electronic device having access (wired or wireless) to the Internet 108.

The display screen 140 of the user device 104 is configured to display data to a user of the user device 104 including the difficulty data 136 that includes the operational difficulty rating 142 (also referred to herein as a difficulty score and/or a difficulty value). The display screen 140 may be configured as an LCD flat panel display, for example.

The input device 144 is typically configured as a touchscreen applied over the display screen 140. The input device 144 accepts tactile inputs from the user for operating the user device 104 and the computer system 102. In some embodiments, the input device 144 includes an imaging device 158 (also referred to herein as a camera and/or a scanner) configured to generate the document text data 132 from a printed or hardcopy version of the document 134 or from text of the document 134 displayed on an electronic display screen (not shown). Still further, the input device 144 includes buttons, switches, and the like for receiving user inputs for operating a user interface 162 displayed on the display screen 140.

The transceiver 148 of the user device 104 is configured to send electronic data to the computer device 102 using the Internet 108 and to receive electronic data from the computer device 102 using the Internet 108. In one embodiment, the transceiver 148 includes a wired connection to the Internet 108, and in another embodiment the transceiver 148 includes a wireless connection to the Internet 108. In some embodiments, the transceiver 148 sends and receives data using a cellular network, a wireless local area network ("Wi-Fi"), a personal area network, and/or any other wireless network. Accordingly, the transceiver 148 is compatible with any desired wired or wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 152 of the user device 104 is an electronic data storage unit, which is also referred to herein as a non-transient computer-readable medium. The memory 152 is configured to store the text data 132. The memory 152 also stores any other electronic data associated with the user device 104. In another embodiment, the neural network 112 is stored on the memory 152 of the user device 104 and is operated by the user device 104 instead of the computer system 102.

The text data 132 is electronic data corresponding to the words, sentences, and paragraphs, of the document 134. That is, the text data 132 includes data corresponding to the organizational structure of the document 134, such as word data 166, sentence structure data 170, and paragraph structure data 174.

In one embodiment, the word data 166 includes data identifying each word in the document 134 and the frequency of occurrence of each word in the document 134. The word data 166 may also identify the position of each word within the document. For example, the word data 166 may indicate that the term "hammer drill" appears ten times in the document 134 and occurs three times in the first two sentences of the document 134.

The sentence structure data 170, in one embodiment, includes data identifying the words included in each sentence and the position/order of each sentence within the document 134 and within each paragraph of the document 134. For example, the sentence data 170 may identify the words included therein, which paragraph the sentence is included, which page of the document 134 the sentence is located, and the position of the sentence within the paragraph. That is, for example, the sentence data 170 may identify a sentence as the first sentence of the fifth paragraph on page two of the document 134.

The paragraph structure data 174, in one embodiment, includes data identify the words and the sentences included in each paragraph within the document 134 and the position/order of each paragraph within the document 134. For example, the paragraph structure data 174 may identify a paragraph as the third paragraph of the document 134 and appearing on pages two and three of the document 134.

The controller 156 of the user device 104 is configured to execute program instructions for controlling the display screen 140, the input device 144, the transceiver 148, and the memory 152. The controller 156 is configured as a central processing unit ("CPU"), a microprocessor, a processor, or any other type of electronic control chip.

Figure 2:
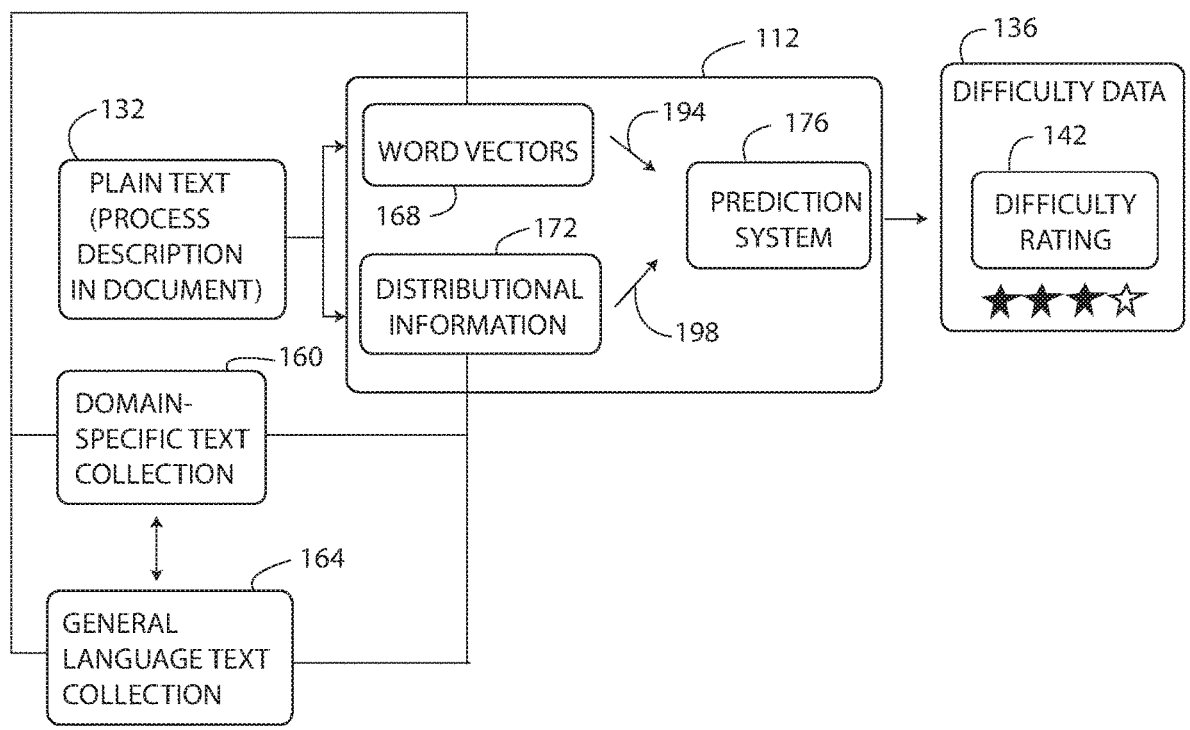
FIG. 2 is a block diagram of an architecture of an exemplary neural network used by the computer system of FIG. 1.

FIG. 2 illustrates an exemplary architecture of the neural network 112, the text data 132, the difficulty data 136, and training data 160, 164. The neural network 112 receives the text data 132, computes linguistic features from the text data 132, and predicts an operational difficulty level, which is included in the difficulty data 136. Specifically, the neural network 112 is configured to predict the operational difficulty level of a domain-specific process described in the document 134, as represented by the text data 132. For example, the neural network 112 automatically determines a difficulty level of cooking recipes (cooking domain), automobile repair/maintenance instructions (automotive domain), home repair/maintenance instructions (home domain), assembly instructions (such as furniture assembly, assembly domain), business tasks (business domain), power tool setup and usage (power tool domain), or DIY-instructions (DIY domain).

The architecture of the neural network 112 includes a plurality of word vectors 168 and a plurality of statistical information vectors 172 that are operatively connected to a prediction system 176. The word vectors 168 and the statistical information vectors 172 are generated in advance and are each based on training documents/data including a domain-specific text collection 160 and a general-language text collection 164. The domain-specific text collection 160 is typically in the same domain as the text data 132 to be analyzed. For example, both the text data 132 and the domain-specific text collection 160 may include text from the power tool domain, the automotive repair domain, or the home cooking domain. The general language text collection 164 is typically based on texts from multiple domains and/or a global domain and is not limited to the domain of the text data 132.

The word vectors 168 are vectors generated by the neural network 112 based on the domain-specific text collection 160 and the general-language text collection 164. The word vectors 168 are word-level vectors corresponding to the words used in the domain-specific text collection 160 and the general-language text collection 164. That is, the word vectors 168 may associate the words "chuck," "battery pack," and "drill bit" with a power tool domain.

The statistical information vectors 172 are vectors generated by the neural network 112 based on the domain-specific text collection 160 and the general-language text collection 164. The statistical information vectors 172, in one embodiment, is word-level, sentence-level, paragraph-level, document-level, and domain-level data. That is, the statistical information vectors 172 may associate the words "chuck," "battery pack," and "drill bit" with a power-tool domain. The statistical information vectors 172 may also be based on a frequency of each word as used in each specific domain and in the general-language corpus. Moreover, the statistical information vectors 172 may be based on a corresponding of "difficulty" of processes associated with each word, sentence, paragraph, and document. For example, the word "mix" may be associated with a high level of difficulty in the power tool domain, a low level of difficulty in the home cooking domain, and a different level of difficulty in the general-language domain. Additionally, documents directed to the domain of heart surgery are associated with a high relative difficulty level and documents directed to the domain of first aid are associated with a low relative difficulty level.

The prediction system 176 receives a word vector output 194 from the word vectors 168 based on the text data 132, and a statistical output 198 from the statistical information vectors 172 based on the text data 132. Then, the prediction system 176 generates the difficulty data 136, which includes the operational difficulty rating 142.

The difficulty data 136, in one embodiment, rates the operational difficulty of the process described in the text the document 134 on a scale of zero to one hundred, zero to ten, zero to five, and zero to four with zero being a comparatively easy process for the user and the upper limit of the range being a comparatively difficult or hard process for the user. As shown in the exemplary difficulty data 136 of FIG. 2, the difficulty rating 142 of the analyzed process is equal to three out of four. In other embodiments, any other scale or range is used to represent the relative difficulty of the process described in the text data 132.

After the difficulty data 136 is generated and stored in the memory 124, in one embodiment, the computer system 102 transmits the difficulty data 136 to the user device 104 for display on the display screen 140. The user can then make decisions about the best use of his or her time based on the operational difficulty data 136.

Hierarchical Attention Networks (HATT) have been used for sentiment analysis or event detection in the natural-language processing domain. HATT usually consist of two layers of bidirectional gated recurrent unit (GRU-based) sequence encoders. On the first layer, word information is processed, pre-trained word vectors are retrieved for the words in the plain input text and then are concatenated as a combined sentence representation. The second layer processes the sentences and then the information is cumulated at the document level. On each layer there exists an attention component, which gives a higher weight to more relevant words and sentences for the prediction task to perform. The attention weights are then given back to the system, to weight the concatenation of the word representation to get the sentence representation. In the same way, the sentence representations are weighted by the attentions and combined to form the document representation.

Figure 3:
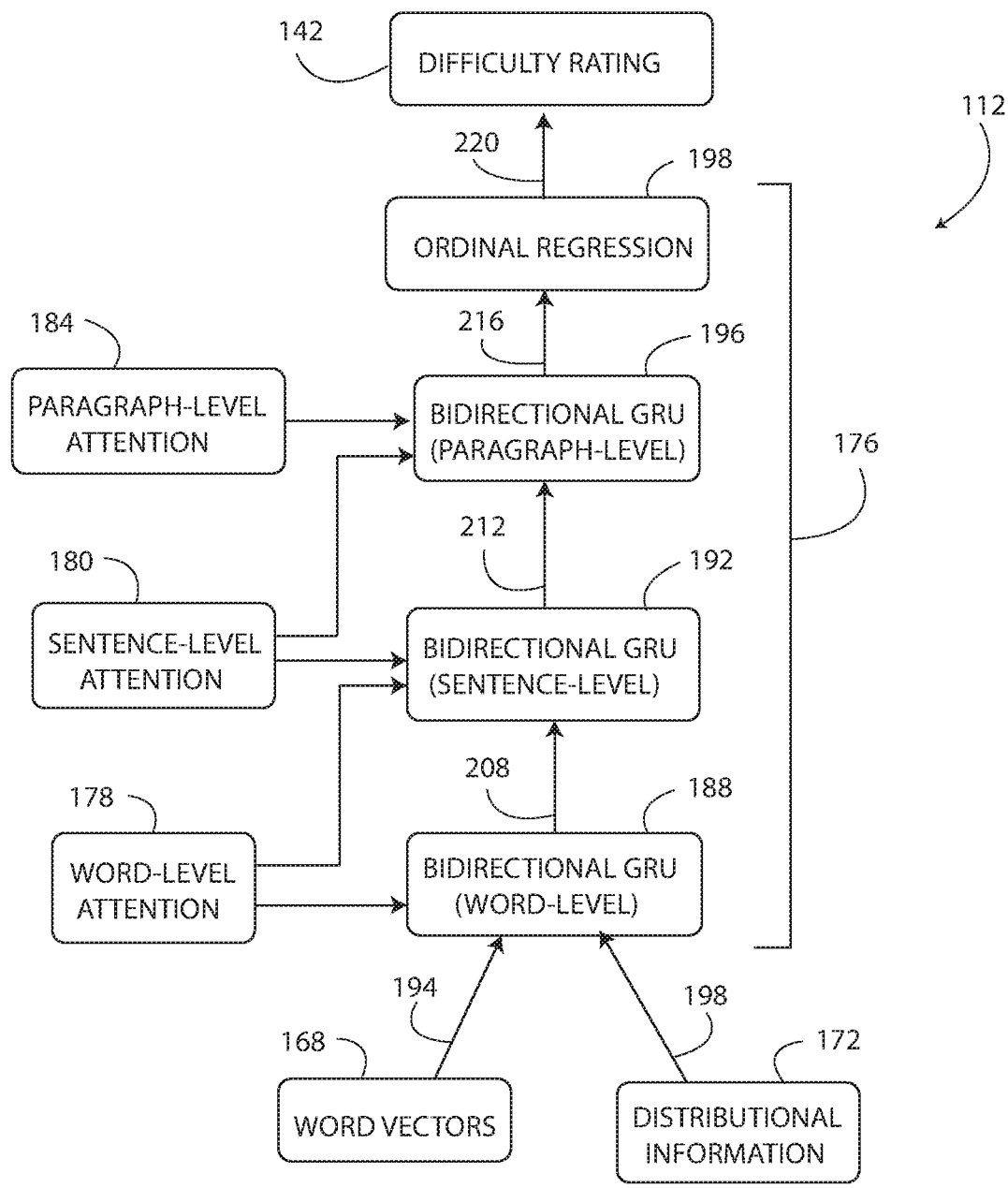
FIG. 3 is block diagram illustrating a method of generating the difficulty data using the difficulty system of FIG. 1 and based on a three-tier P-HATT configuration, as disclosed herein.

With reference to FIG. 3, the system 100 modifies the HATT to make the model more accurately fit the task of domain-specific process operational difficulty prediction. Process descriptions usually consist of several different sections and for the same type of description, they have a relatively stable structure. For example, for cooking recipes or DIY instructions, there is usually an introduction, a section with tools or cookware, material or ingredients and a list of steps. The difficulty in performing the task or recipe arises from each of these sections, may it be a long list of unusual materials which are hard to obtain, or the actual steps to be taken to perform the task.

The system 100 improves the HATT by configuring the neural network 112 to exploit semantics encoded in word embeddings of the text data 132 describing the process of the document 134. Specifically, in determining the difficulty data 136, the neural network 112 uses a process referred to herein as process hierarchical attention network "P-HATT." The neural network 112 uses deep learning with automatically-extracted linguistic features to predict the operational difficulty of the text data 132. As shown in FIG. 3, the automatically-extracted linguistic features include processing the text data 132 through the word vectors 168 and the statistical information vectors 172 based on at least three tiers of hierarchical structure including word-level data 178 (i.e. word-level attention), sentence-level data 180 (i.e. sentence-level attention), and paragraph-level data 184 (i.e. paragraph-level attention).

The word-level data 178 is based on the word vector output 194 and the statistical information output 198 that corresponds to a word-level processing of the text data 132 by the neural network 112. The sentence-level data 180 is based on the word vector output 194 and the statistical information output 198 that corresponds to a sentence-level processing of the text data 132 by the neural network 112. The paragraph-level data 184 is based on the word vector output 194 and the statistical information output 198 that corresponds to a paragraph-level processing of the text data 132 by the neural network 112.

The "three-tiered approach" configures the neural network 112 to breakdown the text data 132 into various sections that are particularly associated with the domain of the text data 132. As described above, in a document 134 resulting in text data 132 describing a process, often the document 134 is organized in three sections. For example, in the domain of home cooking, in a first section, the document 134 (i.e. the recipe) includes the materials (i.e. foodstuffs) that are used to prepare the meal. In a second section, the document 134 includes the kitchen tools that are used to prepare the meal. In a third section, the document 134 includes a description of the steps for preparing the meal using the listed materials and the listed tools. As another example, in the DIY domain or the home repair domain exemplary sections of the document 134 include a materials section, a tools section, and a description of the process steps section. An attention network at the paragraph-level fits text data 132 organized according to the three-tiered approach in a workflow description. Moreover, by training the neural network 112 to process the text data 132 according to the three-tiered approach, the P-HATT neural network 112 makes accurate predictions regarding the difficulty of the process described in the document 134.

In generating the difficulty data 136, the prediction system 176 based on the three-tier approach P-HATT neural network 112 includes a first bidirectional GRU 188 that receives the word vectors 168, the statistical information vectors 172, and the word-level data 178 of the text data 132 and generates a word-level output 208. The P-HATT neural network 112 also includes a second bidirectional GRU 192 that receives the word-level data 178 of the text data 132, the sentence-level data 180 of the text data 132, and the word-level output 208 of the first bidirectional GRU 188. The second bidirectional GRU 192 generates a sentence-level output 212. The P-HATT neural network 112 further includes a third bidirectional GRU 196 that receives the sentence-level data 180 of the text data 132, the paragraph-level data 184 of the text data 132, and the sentence-level output 212 of the second bidirectional GRU 196. The third bidirectional GRU 196 generates a paragraph-level output 216, which is provided to an ordinal regression (ORD) unit 198 of the prediction system 176, as described herein. The paragraph-level output 216 is also referred to herein as a GRU output, since the paragraph-level output 216 is the output of the third and final GRU 196.

With further reference to FIG. 3, the prediction system 176 further improves HATT by exploiting the typical nature of operational difficulty levels being ordered classes. As shown in FIG. 3, the paragraph-level output 216 of the third bidirectional GRU 196 is received by the ORD unit 198 instead of a classification unit. In document classification, the documents are classified into different categories with little overlapping. Whereas, operational difficulty is ranked in ordinal order from least to most category, which, therefore, is more suited for processing by the ORD 198. While ORD units are typically used in information retrieval contexts to rank the relatedness of documents, the ORD unit 198 has not been used in predicting the operational difficulty of workflows and process, as is done by the system 100. Thus, the system 100 presents a new and surprisingly useful application of the ORD unit 198 that is not known in the prior art and offers many advantages over known systems and processes.

For example, the ORD unit 198 is a special prediction task in which knowledge about the ordering of the classes is implied, and can thus be seen as a medium between classification and regression. The P-HATT neural network 112 is configured to use the ORD unit 198 because operational difficulty levels are typically ordered classes, which is why the neural network 112 is configured with the ORD unit 198 instead of a classification task or unit. The ORD unit 198 has an advantageous side-effect that the approach for generating the difficulty data 136 used by the neural network 112 replaces data sampling and is especially effective for highly-imbalanced data. When using the ORD unit 198, the penalty for a misclassification is set higher the more two classes are spaced apart on a scale. With this approach, the system 100 "learns" information that some neighboring classes share but distinguishes the information from more distant classes. The technique and process of the system 100, therefore, has the advantageous side-effect that can be equivalent to the effect of sampling technique. Especially if the class sizes in the underlying data are very imbalanced, common sampling techniques might fail if some classes are too small. Using the ORD unit 198, discriminating information about a small class can be enhanced using information about a neighboring class, thereby making generation of the difficulty data 136 very accurate, as compared to other configurations and types of neural networks.

Moreover, the neural network 112 is configured to overcome issues associated with data sparseness of the text data 132, which may be an issue in certain domain-specific process documents 134 from which the text data 132 is generated. Data sparseness is an issue because for a specific domain there is usually less text material and more domain-specific terminology to be learned than for general language. Domain-specific terminology is essential, because the neural network 112 is expected to draw word-level attention to terminology, and text data 132 with many "easy" terms might indicate an "easy" process, and text data 132 with many "difficult" terms might indicate a "difficult" process. As an example from the domain of cooking, a recipe may be "easy" if it is associated with the term "omelet," since this is a dish that is easy for most users to prepare. Whereas, if the recipe requires a "bain-marie," the recipe is typically determined to be "difficult," since most users do not have the tools typically used to prepare such a dish.

The neural network 112 overcomes issues of data sparseness in domain specific text data 132. Specifically, the system 100 addresses the issue that very specific terminology may occur in the text data 132 only infrequently. Such an approach influences both the quality of the pre-trained word vectors 168 and the prediction accuracy of the hierarchical attention model of the neural network 112. The P-HATT neural network 112 exploits the knowledge that not only the meaning of the word (represented by the word vectors 168) but also the word's distributional characteristics (represented by the statistical information vectors 172) reflects the word's difficulty. In this approach, the neural network 112 uses two kinds of distributional characteristics. First, is the occurrence of a term or terms in general-language text documents as compared to the occurrence of the term or terms in domain-specific texts, such as the document 134. For example, if a word in the text data 132 appears very often in domain-specific text document 134, but very rarely in general-language text documents, then the word is considered more difficult than a term that appears often in general-language text documents. Moreover, a word that rarely appears in domain-specific text documents 134 and general-language text documents is configured to be even more difficult and is typically indicative of a difficult process or task. Second, the neural network 112 determines that the difficulty level of the documents in which the terms of the text data 132 mainly occur corresponds to the difficulty of the terms in the document. For at least this reason, the neural network 112 also computes the distribution of each term within the different difficulty levels of the training documents (i.e. the word vectors 168 and the statistical information vectors 172).

The system 100 provides numerous advantages over the prior art including further enriching the information on the word-level to compensate for data sparseness. Moreover, the system 100 improves the accuracy of the difficulty data 136 over other systems by using the P-HATT three-tiered neural network 112, which uses the ORD unit 198 instead of document classification to determine the operational difficulty of a task or process. The architecture of the neural network 112 improves the efficiency with which accurate difficulty data 136 can be generated automatically.

In operation, the system 100 is configured to label documents 134 based on the determined difficulty from the difficulty data 136, or to recommend documents 134 to users according to the user's skills or the user's desired difficulty level. Moreover, the system 100 is configured to learn the expertise level of a user from documents 134 provided to the system 100. That is, when a user or users author documents 134, the documents 134 are processed by the system 100 to determine the difficulty rating 142 of the documents 134. The difficulty rating 142 of the documents 134 corresponds to the ability or skill level of the author(s), with a higher difficulty rating 142 corresponding to a more highly-skilled author(s).

The system 100 with the neural network 112 applies a Process Hierarchical Attention Model (P-HATT) to the task of domain-specific process difficulty prediction in text documents 134. The neural network 112 combines both HATT and ORD to arrive at the P-HATT disclosed herein. The neural network 112 processes text data 132 at the paragraph level, the sentence level, and the word level. The neural network 112 uses the ORD unit 198 which uses ordinal regression as a substitution for classification. The neural network 112 and the corresponding system 100 are an improvement to the functioning of a computer by enriching word-level information with statistical information to countervail data sparseness.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of determining an operational difficulty of a process described in a document including text, comprising:
    generating text data corresponding to the text of the document;
    generating a word vector output by processing the text data through a plurality of word vectors, the plurality of word vectors based on a domain-specific text collection and a general-language text collection;
    generating a statistical information output by processing the text data through a plurality of statistical information vectors, the plurality of statistical information vectors based on the domain-specific text collection and the general-language text collection;
    generating a gated recurrent unit (GRU) output by processing (i) the word vector output, (ii) the statistical information output, (iii) word-level data based on the text data, (iv) sentence-level data based on the text data, and (v) paragraph-level data based on the text data through at least one GRU;
    generating difficulty data by processing the GRU output through an ordinal regression unit, the difficulty data corresponding to the operational difficulty of the process described in the documenting including the text; and
    associating the generated difficulty data with the document, such the operational difficulty of the process described in the document is numerically quantifiable.

2. The method as claimed in claim 1, wherein generating the GRU output comprises:
    processing the word vector output, the statistical information output, and the word-level data through a first GRU to generate a word-level output;
    processing the word-level output, the word-level data, and the sentence-level data through a second GRU to generate a sentence-level output; and
    processing the sentence-level output, the sentence-level data, and the paragraph-level data through a third GRU to generate the GRU output.

3. The method as claimed in claim 1, wherein the difficulty data is a ranking of the operational difficulty of the process, as performed by the ordinal regression unit, in relation to an operational difficulty of (i) first other processes included in the domain-specific text collection, and (ii) second other processes included in the general-language text collection.

4. The method as claimed in claim 1, further comprising:
    generating the text data with an imaging device of a user device configured to image the document;
    transmitting the generated text data to a computer system configured to generate the difficulty data;
    transmitting the generated difficulty data to the user device; and
    generating an output on a display of the user device based on the transmitted difficulty data.

5. The method as claimed in claim 1, further comprising:
    determining a plurality of respective skill levels for a plurality of people;
    assigning the process described in the document to people of the plurality of people having a skill level that is suitable for completing the process based on the difficulty data; and
    preventing the process described in the document from being assigned to people of the plurality of people having the skill level that is unsuitable for completing the process based on the difficulty data.

6. A method of determining an operational difficulty of a process described in a document including text, comprising:
    generating text data corresponding to the text of the document;
    generating a word vector output by processing the text data through a plurality of word vectors, the plurality of word vectors based on a domain-specific text collection and a general-language text collection;
    generating a statistical information output by processing the text data through a plurality of statistical information vectors, the plurality of statistical information vectors based on the domain-specific text collection and the general-language text collection;
    processing the word vector output, the statistical information output, and word-level data based on the text data through a first gated recurrent unit (GRU) to generate a word-level output;
    processing the word-level output, the word-level data, and sentence-level data based on the text data through a second GRU to generate a sentence-level output;
    processing the sentence-level output, the sentence-level data, and paragraph-level data based on the text data through a third GRU to generate a GRU output;
    generating difficulty data by processing the GRU output through an ordinal regression unit, the difficulty data corresponding to the operational difficulty of the process described in the documenting including the text; and
    associating the generated difficulty data with the document.

7. The method as claimed in claim 6, wherein the difficulty data is a ranking of the operational difficulty of the process, as performed by the ordinal regression unit, in relation to an operational difficulty of (i) first other processes included in the domain-specific text collection, and (ii) second other processes included in the general-language text collection.

8. The method as claimed in claim 6, further comprising:
    generating the text data with an imaging device of a user device configured to image the document;
    transmitting the generated text data to a computer system configured to generate the difficulty data;
    transmitting the generated difficulty data to the user device; and
    generating an output on a display of the user device based on the transmitted difficulty data.

9. The method as claimed in claim 6, further comprising:
    determining a plurality of respective skill levels for a plurality of people;

assigning the process described in the document to people of the plurality of people having a skill level that is suitable for completing the process based on the difficulty data; and preventing the process described in the document from being assigned to people of the plurality of people having the skill level that is unsuitable for completing the process based on the difficulty data.

10. A difficulty system for determining an operational difficulty of a process described in a document including text, comprising:

a user device including
an imaging device configured to generate text data of the text,
a transceiver configured to transmit the text data, and
a display screen configured to display difficulty data; and a computer system including
a transceiver configured to receive the transmitted text data,
a controller including a neural network configured to
generate a word vector output by processing the text data through a plurality of word vectors, the plurality of word vectors based on a domain-specific text collection and a general-language text collection,
generate a statistical information output by processing the text data through a plurality of statistical information vectors, the plurality of statistical information vectors based on the domain-specific text collection and the general-language text collection,
generate a gated recurring unit (GRU) output by processing (i) the word vector output, (ii) the statistical information output, (iii) word-level data based on the text data, (iv) sentence-level data based on the text data, and (v) paragraph-level data based on the text data through at least one GRU, and
generate difficulty data by processing the GRU output through an ordinal regression unit, the difficulty data corresponding to the operational difficulty of the process described in the document,
wherein the transceiver of the computer system is configured to transmit the difficulty data to the transceiver of the user device for display on the display screen, and
wherein the difficulty data is associated with the document.

11. The difficulty system as claimed in claim 10, wherein when generating the GRU output, the controller is further configured to:
process the word vector output, the statistical information output, and the word-level data through a first GRU to generate a word-level output;
process the word-level output, the word-level data, and the sentence-level data through a second GRU to generate a sentence-level output; and
process the sentence-level output, the sentence-level data, and the paragraph-level data through a third GRU to generate the GRU output.

12. The difficulty system as claimed in claim 10, wherein the difficulty data is a ranking of the operational difficulty of the process, as performed by the ordinal regression unit, in relation to an operational difficulty of (i) first other processes included in the domain-specific text collection, and (ii) second other processes included in the general-language text collection.

* * * * *